United States Patent
Wang et al.

(10) Patent No.: US 11,880,967 B2
(45) Date of Patent: Jan. 23, 2024

(54) IMAGE SELECTION METHOD, SELF-PROPELLED APPARATUS, AND COMPUTER STORAGE MEDIUM

(71) Applicant: BEIJING ROBOROCK INNOVATION TECHNOLOGY CO., LTD., Beijing (CN)

(72) Inventors: Yixing Wang, Beijing (CN); Zhen Wu, Beijing (CN); Haojian Xie, Beijing (CN); Lei Zhang, Beijing (CN)

(73) Assignee: Beijing Roborock Technology Co., Ltd., Beijing (CN)

( * ) Notice: Subject to any disclaimer, the term of this patent is extended or adjusted under 35 U.S.C. 154(b) by 0 days.

(21) Appl. No.: 17/995,730

(22) PCT Filed: Jan. 5, 2021

(86) PCT No.: PCT/CN2021/070301
§ 371 (c)(1),
(2) Date: Oct. 7, 2022

(87) PCT Pub. No.: WO2021/203784
PCT Pub. Date: Oct. 14, 2021

(65) Prior Publication Data
US 2023/0122704 A1     Apr. 20, 2023

(30) Foreign Application Priority Data
Apr. 9, 2020   (CN) .......................... 202010275969.5

(51) Int. Cl.
*G06K 9/00* (2022.01)
*G06T 7/00* (2017.01)
(Continued)

(52) U.S. Cl.
CPC .......... *G06T 7/0002* (2013.01); *A47L 11/4011* (2013.01); *G05D 1/0238* (2013.01);
(Continued)

(58) Field of Classification Search
CPC ......... G06T 7/0002; G06T 2207/30168; G06T 2207/30261; A47L 11/4011;
(Continued)

(56) References Cited

U.S. PATENT DOCUMENTS

2018/0354132 A1   12/2018   Noh et al.
2019/0258883 A1   8/2019    Britto Mattos Lima et al.

FOREIGN PATENT DOCUMENTS

CN    103002152 A    3/2013
CN    103542873 A    1/2014
(Continued)

OTHER PUBLICATIONS

Newbury, Rhys, et al. "Learning to Take Good Pictures of People with a Robot Photographer." arXiv preprint arXiv:1904.05688 (2019). (Year: 2019).*
(Continued)

*Primary Examiner* — Jonathan S Lee
(74) *Attorney, Agent, or Firm* — Thomas Horstemeyer, LLP

(57) ABSTRACT

An image selection method, applied to a self-propelled apparatus, includes: collecting an image from a surrounding environment through an image collection device during the self-propelled apparatus travels; scoring the image according to a scoring rule when there is a recognizable obstacle in the collected image, wherein a value of the scoring is used to indicate an imaging quality of the recognizable obstacle in the image; and selecting an image that comprises the recognizable obstacle and that has a highest score as a to-be-displayed image in response to receive a request to view the image of the recognizable obstacle. A computer-readable storage medium and a self-propelled apparatus are further provided.

14 Claims, 2 Drawing Sheets

(51) Int. Cl.
*A47L 11/40* (2006.01)
*G05D 1/02* (2020.01)

(52) U.S. Cl.
CPC ........ *G05D 1/0246* (2013.01); *A47L 2201/04* (2013.01); *G05D 2201/0203* (2013.01); *G06T 2207/30168* (2013.01); *G06T 2207/30261* (2013.01)

(58) Field of Classification Search
CPC .............. A47L 2201/04; G05D 1/0238; G05D 1/0246; G05D 2201/0203
USPC ........................................................ 382/104
See application file for complete search history.

(56) References Cited

FOREIGN PATENT DOCUMENTS

| | | |
|---|---|---|
| CN | 106527423 A | 3/2017 |
| CN | 106791393 A | 5/2017 |
| CN | 107454969 A | 12/2017 |
| CN | 107625489 A | 1/2018 |
| CN | 107992086 A | 5/2018 |
| CN | 108125622 A | 6/2018 |
| CN | 108833942 A | 11/2018 |
| CN | 109101862 A | 12/2018 |
| CN | 109947109 A | 6/2019 |
| CN | 110688913 A | 1/2020 |
| CN | 110784644 A | 2/2020 |
| CN | 110895409 A | 3/2020 |
| CN | 111538330 A | 8/2020 |
| EP | 2725443 A2 | 4/2014 |
| JP | 2020049653 A | 4/2020 |
| WO | WO2017081870 A1 | 5/2017 |

OTHER PUBLICATIONS

Kim, Jeongdae, Jaehyeong Park, and Yongtae Do. "Monocular detection of pedestrians for the safe indoor navigation of a mobile robot." 2013 IEEE RO-MAN. IEEE, 2013. (Year: 2013).*
Wiedemann, Matthias, et al. "Analysis and characterization of the PMD camera for application in mobile robotics." IFAC Proceedings vols. 41.2 (2008): 13689-13694. (Year: 2008).*
Schroeter, Christof, et al. "Autonomous robot cameraman-observation pose optimization for a mobile service robot in indoor living space." 2009 IEEE International Conference on Robotics and Automation. IEEE, 2009. (Year: 2009).*
PCT, International Search Report for PCT/CN2021/070301, dated Mar. 29, 2021.
CN, Notice of Allowance for Chinese Application No. 202010275969.5, dated Jan. 30, 2022.
CN, Office Action for Chinese Application No. 202010275969.5, dated Mar. 24, 2021.
CN, Office Action for Chinese Application No. 202010275969.5, dated Aug. 31, 2021.
Li, Ii-Ii, Research on Optimization Recognition Method for the Obstacle in Robot Vision, College of Computer and Control Engineering, Qiqihar University, China, vol. 33-06, Jun. 2016, pp. 306-309.

* cited by examiner

IMAGE SELECTION METHOD, SELF-PROPELLED APPARATUS, AND COMPUTER STORAGE MEDIUM

CROSS-REFERENCE TO RELATED APPLICATION

This application is a United States national phase of a Patent Cooperation Treaty (PCT) application under PCT/CN2021/070301 filed on Jan. 5, 2021, which claims priority to Chinese Patent Application No. 202010275969.5 filed on Apr. 9, 2020. Priority to the preceding patent applications is expressly claimed, and the disclosures of the preceding applications are hereby incorporated herein by reference in their entireties and for all purposes.

TECHNICAL FIELD

The present disclosure relates to image processing technologies, and in particular, to an image selection method, a self-propelled apparatus, and a computer-readable storage medium.

BACKGROUND

As there is continuous innovation of products in intelligence, sweepers (that is, sweeping robots), like white goods, are developed to be with a higher level of intelligence from a primary-level intelligence, and replaces human labors gradually to clean.

Typically, a sensor is disposed at a front side of a sweeper and can detect an obstacle. If running up against a wall or any other obstacle, the sweeper can automatically make a turn to avoid the obstacle. However, at present, the sweeper cannot visually view the obstacle that it avoids, and cannot accurately recognize the obstacle that the sweeper avoids, and user experience is poor.

SUMMARY

According to a first aspect of the present disclosure, an image selection method applied to a self-propelled apparatus is provided. The method includes:
  collecting an image from a surrounding environment during the self-propelled apparatus travels;
  scoring the image according to a scoring rule when there is a recognizable obstacle in the collected image, wherein a value of the scoring is used to characterize an imaging quality of the recognizable obstacle in the image; and
  selecting an image that includes the recognizable obstacle and that has a highest score to be a to-be-displayed image in response to receive a request to view the image of the recognizable obstacle.

According to an implementation of the present disclosure, the method further includes: after the scoring the image according to the scoring rule, storing at least the image that has the highest score among all images including the recognizable obstacle.

According to an implementation of the present disclosure, the method further includes: storing at least unique identification information that identifies the image that has the highest score.

According to an implementation of the present disclosure, scoring the image according to the scoring rule specifically includes: scoring the image through one or more of following scoring parameters: a first scoring parameter, characterizing an angular velocity of the self-propelled apparatus when the image is collected; a second scoring parameter, characterizing a distance between the self-propelled apparatus and the recognizable obstacle when the image is collected; a third scoring parameter, characterizing a size of an area that the recognizable obstacle occupies in the image; a fourth scoring parameter, characterizing a position of the recognizable obstacle in the image; and a fifth scoring parameter, characterizing whether a fill light is turned on when the image is collected.

According to an implementation of the present disclosure, when the image is scored with at least two scoring parameters of the first scoring parameter, the second scoring parameter, the third scoring parameter, the fourth scoring parameter, and the fifth scoring parameter are used to score the image, a score of the image is obtained by weighting parameter values of the at least two scoring parameters through preset weighting values.

According to an implementation of the present disclosure, regarding the first scoring parameter, a parameter value corresponding to a relatively large absolute value of the angular velocity is greater than or equal to a parameter value corresponding to a relatively small absolute value of the angular velocity; regarding the second scoring parameter, a parameter value corresponding to a distance value within a specific range is greater than or equal to a parameter value corresponding to another distance value; regarding the third scoring parameter, a parameter value corresponding to a relatively large area that the recognizable obstacle occupies in the image is greater than or equal to a parameter value corresponding to a relatively small area that the recognizable obstacle occupies in the image; regarding the fourth scoring parameter, the closer the position of the recognizable obstacle in the image to a center of the image is, the greater the parameter value; or regarding the fifth scoring parameter, a parameter value corresponding to a case that the fill light is turned off is greater than or equal to a parameter value corresponding to a case that the fill light is turned on.

According to a second aspect of the present disclosure, a self-propelled apparatus is further provided. The apparatus includes: an image collection device, configured to collect an image from a surrounding environment during the self-propelled apparatus travels; a scoring device, configured to: to score the image according to a scoring rule in a case that there is a recognizable obstacle in the collected image, wherein a value of the scoring is used to characterize an imaging quality of the recognizable obstacle in the image; and a display control device, configured to select an image that comprises the recognizable obstacle and has a highest score as a to-be-displayed image in response to receiving a request to view the image of the recognizable obstacle.

According to an implementation of the present disclosure, the device further includes: a storage device, configured to: at least store, after the image is scored by the scoring device according to the scoring rule, the image that has the highest score among all images comprising the recognizable obstacle.

According to an implementation of the present disclosure, the storage device is further configured to store at least identification information that uniquely identifies the image that has the highest score.

According to an implementation of the present disclosure, the scoring device is configured to score the image with one or more of following scoring parameters: a first scoring parameter, characterizing an angular velocity of the self-propelled device when the image is collected; a second scoring parameter, characterizing a distance between the self-propelled apparatus and the recognizable obstacle when the image is collected; a third scoring parameter, characterizing a size of an area that the recognizable obstacle occupies in the image; a fourth scoring parameter, characterizing a position of the recognizable obstacle in the image; and a fifth scoring parameter, characterizing whether a fill light is turned on when the image is collected.

According to an implementation of the present disclosure, the scoring device is configured to: when the image is scoured with at least two scoring parameters of the first scoring parameter, the second scoring parameter, the third scoring parameter, the fourth scoring parameter, and the fifth scoring parameter, obtain a score of the image by weighting parameter values of the at least two scoring parameters through preset weighting values.

According to a third aspect of the present disclosure, a computer-readable storage medium is still further provided. The storage medium includes a group of computer-executable instructions, and when the instructions are executed, operations of the image selection method are performed.

According to a fourth aspect of the present disclosure, a self-propelled device is still further provided. The self-propelled device includes a processor and a memory. The memory stores computer program instructions that are executable by the processor. When the instructions are executed by the processor, operations of the image selection method are performed.

It needs to be understood that teaching of the present disclosure does not need to implement all the foregoing beneficial effects, and specific technical effects can be achieved through specific technical solutions. In addition, another implementation of the present disclosure may further implement beneficial effects that are not mentioned above.

BRIEF DESCRIPTION OF DRAWINGS

The foregoing and other objectives, features, and advantages of exemplary implementations of the present disclosure are easier to be understood through following detailed descriptions with reference to the accompanying drawings. In the accompanying drawings, several implementations of the present disclosure are illustrated as examples instead of limitations.

The following accompanying drawings of the present disclosure are used herein as a part of the present disclosure for understanding the present disclosure. The accompanying drawings illustrate embodiments of the present disclosure and descriptions thereof, which are used to explain the principles of the present disclosure. It should be noted that the figures are not necessarily drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DESCRIPTION OF EMBODIMENTS

The principle and the gist of the present disclosure are described hereinafter with reference to several example implementations. It should be understood that the implementations are provided only for one of ordinary skill in the art to understand better and then implement the present disclosure, but not to constitute a limitation in any manner on the scope of the present disclosure. On the contrary, the implementations are provided for the present disclosure to be clearer and more complete, and for the scope of the present disclosure to be fully understood by one of ordinary skill in the art.

The following further describes in detail technical solutions of the present disclosure with reference to the accompanying drawings and specific embodiments.

Figure 1:
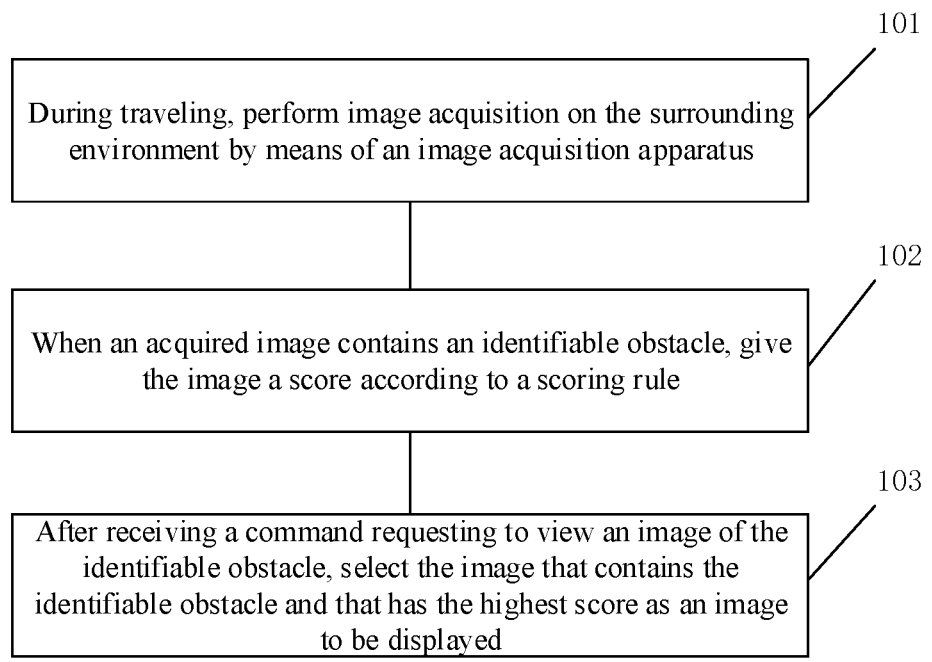
FIG. 1 is a schematic flowchart illustrating implementation of an image selection method according to an embodiment of the present disclosure.

FIG. 1 is a schematic flowchart illustrates implementation of an image selection method according to an embodiment of the present disclosure.

Referring to FIG. 1, the image selection method according to an embodiment of the present disclosure is applicable to a self-propelled apparatus. The method includes: operation 101: collecting an image of a surrounding environment through an image collection device during the self-propelled apparatus travels;

operation 102: scoring the image according to a scoring rule upon determining that there is a recognizable obstacle in the collected image; and operation 103: selecting an image that includes the recognizable obstacle and has a highest score as a to-be-displayed image in response to receiving a request to view an image of the recognizable obstacle.

The self-propelled device may be a sweeper, or may be a cleaning machine configured to clean to-be-cleaned objects such as glass windows.

In operation 101, the image collection device may be a camera disposed at a front side of the sweeper. Specifically, the sweeper is used as an example. The image is collected from the surrounding environment by using the camera in a process in which the sweeper moves.

In operation 102, whether there is a recognizable obstacle in the collected image is first determined, and the image is scored according to a scoring rule upon determining that a recognizable obstacle in included in the collected image. A score value is used to characterize an imaging quality of the recognizable obstacle in the image.

Herein, scoring the image according to the scoring rule in operation 102 specifically includes: scoring the image with any one or any combination of following scoring parameters: a parameter a, indicating an angular velocity of the self-propelled apparatus when the image is collected; a parameter b, indicating a distance between the self-propelled apparatus and the recognizable obstacle when the image is collected; a parameter c, indicating a size of an area that the recognizable obstacle occupies in the image; a parameter d, indicating a position of the recognizable obstacle in the image; and a parameter e, indicating whether a fill light is turned on when the image is collected.

Herein, to determine a value of the parameter c easily, it is possible determine a size of the area that the recognizable obstacle occupies in the image in a manner of rectangle region, that is, determining a size of a rectangle region that the recognizable obstacle occupies in the image. Similar to determining of the parameter c, to determine a value of the parameter d easily, the position of the recognizable obstacle in the image can be determined by determining distances between the rectangle region that the recognizable obstacle occupies and edges of the image.

In a possible implementation, when there are more than two of the foregoing scoring parameters a to e, a score value of the image is obtained by weighting parameter values of the scoring parameters through preset weights.

Specifically, different scoring rules are used for different parameters when determining the parameter values of the foregoing scoring parameters. Regarding the parameter a, a parameter value corresponding to a relatively large absolute value of the angular velocity is greater than or equal to a parameter value corresponding to a relatively small absolute value of the angular velocity, that is, the smaller an absolute value of the angular velocity is, the better; regarding the parameter b, a parameter value corresponding to a distance value within a specific range is greater than or equal to a parameter value corresponding to another distance value, that is, the distance between the self-propelled apparatus and the recognizable obstacle is best when moderate, not too close, and not too far; regarding the parameter c, a parameter value corresponding to a relatively large area that the recognizable obstacle occupies in the image is greater than or equal to a parameter value corresponding to a relatively small that the recognizable obstacle occupies in the image, that is, the greater the size of the rectangle region of the recognizable obstacle in the image, the better; regarding the parameter d, the closer the position of the recognizable obstacle in the image to a center of the image is, the greater the parameter value is, that is, it is relatively good to make the distances between the rectangle region and edges of the collected image longer, the better; or regarding the parameter e, a parameter value corresponding to a case that the fill light is turned off is greater than or equal to a parameter value corresponding to a case that the fill light is turned on, that is, it is relatively good to turn off the fill light.

In an application example, for the foregoing scoring parameters a to e, weights may be ranked from highest to lowest as follows: e, a, b, c, and d.

After operation 102, the self-propelled apparatus may automatically store the image including the recognizable obstacle. To ensure that the image that includes the recognizable obstacle and that has the highest score is selected as a to-be-displayed image in the subsequent operation 103, in a process of automatic storage, at least the image that has the highest score among all images including the recognizable obstacle is required to be stored.

Herein, when storing an image, the self-propelled apparatus may allocate, for each image, unique identification information that can be used to identify the image; and store the identification information associated with the image, so that the corresponding image can be quickly displayed in subsequent image viewing through the identification information carried in the viewing request.

In operation 103, because the image including the recognizable obstacle is already scored, the image that includes the recognizable obstacle and that has the highest score can be directly selected as a to-be-displayed image upon receiving the request to view the image of the recognizable obstacle.

In this way, in the present disclosure, the image collection device disposed on the self-propelled apparatus such as a sweeper collects an image and recognize an image of an obstacle, and then the image of the obstacle is scored according to the scoring rule, and an image of the obstacle that has a highest score is determined as a to-be-displayed image upon receiving a request to view the image of the obstacle, so that the sweeper can visually view the obstacle that the sweeper avoids can be visually viewed through the sweeper. In addition, because the to-be-displayed image of the obstacle has the highest score (that is, has the highest imaging quality), a user can well recognize what the obstacle that the sweeper avoids is, thereby effectively improving user experience.

Similarly, based on the foregoing image selection method, an embodiment of the present disclosure further provides a computer-readable storage medium. The computer-readable storage medium stores a program, and when the program is executed by a processor, the processor is configured to execute at least following operating steps: operation 101: collecting an image from a surrounding environment through an image collection device during traveling; operation 102: scoring the image according to a scoring rule upon determining that a recognizable obstacle is included in the collected image; and operation 103: selecting an image that includes the recognizable obstacle and that has a highest score as a to-be-displayed image in response to receiving a request to view an image of the recognizable obstacle.

Figure 2:
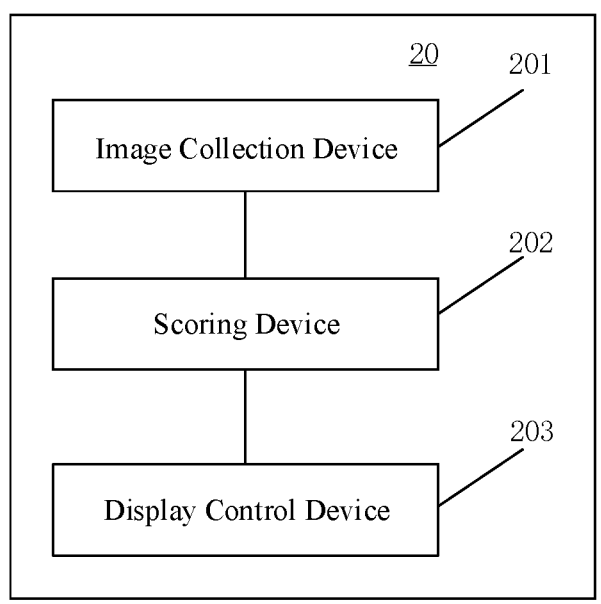
FIG. 2 is a schematic structural diagram illustrating composition of a cleaning machine according to an embodiment of the present disclosure.

Further, based on the foregoing image selection method, an embodiment of the present disclosure further provides a self-propelled apparatus. As illustrated in FIG. 2, the apparatus 20 includes: an image collection device 201, configured to collect an image from a surrounding environment during the apparatus travels; a scoring device 202, configured to: score the image according to a scoring rule upon determining that a recognizable obstacle is included in the collected image, wherein a value of the scoring is used to characterize an imaging quality of the recognizable obstacle in the image; and a display control device 203, configured to select an image that includes the recognizable obstacle and has a highest score as a to-be-displayed image in response to receiving a request to view an image of the recognizable after a command used to require viewing one of images including the recognizable obstacle is received.

According to an implementation of the present disclosure, the apparatus 20 further includes: a storage device, configured to: after the image is scored according to the scoring rule by using the scoring device, store at least an image that has the highest score among all images including the recognizable obstacle.

According to an implementation of the present disclosure, the scoring device 202 is specifically configured to score the image with any one of any combination of following scoring parameters: a parameter a, indicating an angular velocity of the self-propelled apparatus when the image is collected; a parameter b, indicating a distance between the self-propelled apparatus and the recognizable obstacle when the image is collected; a parameter c, indicating a size of an area that the recognizable obstacle occupies in the image; a parameter d, indicating a position of the recognizable obstacle in the image; and a parameter e, indicating whether a fill light is turned on when the image is collected.

According to an implementation of the present disclosure, the scoring device 202 is specifically configured to: when more than two of the foregoing scoring parameters are used, a score of the image is obtained by weighting values of the scoring parameters through preset weighting values. According to an implementation of the present disclosure, regarding the parameter a, a parameter value corresponding to a relatively large absolute value of the angular velocity is greater than or equal to a parameter value corresponding to a relatively small absolute value of the angular velocity; regarding the parameter b, a parameter value corresponding to a distance value within a specific range is greater than or equal to a parameter value corresponding to another distance value; regarding the parameter c, a parameter value corresponding to a relatively large area that the recognizable obstacle occupies in the image is greater than or equal to a parameter value corresponding to a relatively small area that the recognizable obstacle occupies in the image; regarding the parameter d, the closer the position of the recognizable obstacle in the image to a center of the image is, the greater a parameter value of the parameter d is; or regarding the parameter e, a parameter value corresponding to a case that the fill light is turned off is greater than or equal to a parameter value corresponding to a case that the fill light is turned on.

It should to be noted herein that foregoing descriptions in the embodiment of the self-propelled apparatus are similar to foregoing descriptions in the method embodiment illustrated in FIG. 1, and have similar beneficial effects to those of the foregoing method embodiment illustrated in FIG. 1. Therefore, details are not elaborated here. For technical details not disclosed in the embodiment of the self-propelled apparatus of the present disclosure, refer to the foregoing descriptions in the method embodiment illustrated in FIG. 1 of the present disclosure for understanding. For brevity, details are not elaborated here.

It should be noted that, in this specification, terms "include", "comprise", or any of their variants are intended to cover a non-exclusive inclusion, so that a process, a method, an article, or an apparatus that includes a list of elements not only includes those elements but also includes other elements that are not expressly listed, or further includes elements inherent to such a process, method, article, or apparatus. In a case in which there is no other limitations, an element is limited by words "include/comprise one", but this does not exclude another same element that is included in a process, method, article, or apparatus that includes the element.

In the embodiments according to this application, it should be understood that the disclosed method and apparatus may be implemented in another manner. The apparatus embodiment described above is merely an example. For example, division into the units is merely logic function division, and there may be another division manner in actual implementation. For example, a plurality of units or components may be combined or may be integrated into another system, or some features may be ignored or not performed. In addition, mutual coupling, direct coupling, or communications connection between various displayed or discussed components may be through some interfaces, and indirect coupling or communications connection between devices or units may be electrical, mechanical, or of another form.

The foregoing units described as separate components may be or may not be physically separate. The components displayed as units may be or may not be physical units; and may be located at one place or may be distributed on a plurality of network units. Some or all of the units can be selected based on actual requirements to achieve objectives of solutions of the embodiments.

In addition, all functional units in the embodiments of the present disclosure may be integrated in one processing unit, or each unit is independent as one unit, or two or more units are integrated in one unit. The integrated unit may be implemented in a form of hardware, or may be implemented in a form of hardware in combination with a software functional unit.

It could be understood by one of ordinary skill in the art that all or some of steps in the foregoing method embodiment may be implemented by hardware related to program instructions. The foregoing program may be stored in the computer-readable storage medium, and when the program is executed, operations of the foregoing method embodiments are performed. The foregoing storage medium includes various media that can store program code, for example, a removable storage device, a read-only memory (ROM), a magnetic disk, or an optical disc.

Alternatively, when implemented in a form of a software functional module and sold or used as an independent product, the integrated unit in the present disclosure may be stored in a computer-readable storage medium. Based on such an understanding, the technical solutions in the embodiments of the present disclosure essentially or the part contributing to the prior art may be embodied in a form of a software product. The computer software product is stored in a storage medium that includes several instructions for enabling a computer device (which may be a personal computer, a server, a network device, or the like) to perform all or a part of operations of the method described in the embodiments of the present disclosure. The foregoing storage medium includes various media that can store program code, for example, a removable storage device, a ROM, a magnetic disk, and an optical disc.

The foregoing descriptions are merely specific embodiments of the present disclosure, and a protection scope of the present disclosure is not limited to these. Variations or replacements that can be easily obtained by one of ordinary skill in the art within a scope of a technology disclosed in the present disclosure shall fall within the protection scope of the present disclosure. Therefore, the protection scope of the present disclosure shall be defined by the appended claims.

What is claimed is:

1. An image selection method, applied to a self-propelled apparatus, wherein the method comprises:
   collecting an image from a surrounding environment through an image collection device during traveling of the self-propelled apparatus;
   scoring the image according to a scoring rule when there is a recognizable obstacle in the collected image, wherein a value of the scoring is used to indicate an imaging quality of the recognizable obstacle in the image; and
   selecting, among all the scored images comprising the recognizable obstacle, an image that has a highest score as a to-be-displayed image in response to receive a request to view the image of the recognizable obstacle.

2. The method according to claim 1, further comprising: after the scoring the image according to the scoring rule,
   storing at least the image that has the highest score among all images comprising the recognizable obstacle.

3. The method according to claim 2, further comprising:
   at least storing unique identification information that identifies the image that has the highest score.

4. The method according to claim 1, wherein
   the scoring the image according to the scoring rule comprises: scoring the image through one or more of following scoring parameters:
   a first scoring parameter a, characterizing an angular velocity of the self-propelled apparatus when the image is collected;
   a second scoring parameter b, characterizing a distance between the self-propelled apparatus and the recognizable obstacle when the image is collected;
   a third scoring parameter c, characterizing a size of an area that the recognizable obstacle occupies in the image;
   a fourth scoring parameter d, characterizing a position of the recognizable obstacle in the image; and
   a fifth scoring parameter e, characterizing whether a fill light is turned on when the image is collected.

5. The method according to claim 4, further comprising:
when the image is scored with at least two scoring parameters of the first scoring parameter a, the second scoring parameter b, the third scoring parameter c, the fourth scoring parameter d, and the fifth scoring parameter e are used to score the image, obtaining a score of the image by weighting parameter values of the at least two scoring parameters through preset weighting values.

6. The method according to claim 5, wherein
regarding the first scoring parameter a, a parameter value corresponding to a relatively large absolute value of the angular velocity is greater than or equal to a parameter value corresponding to a relatively small absolute value of the angular velocity;
regarding the second scoring parameter b, a parameter value corresponding to a distance value within a specific range is greater than or equal to a parameter value corresponding to another distance value;
regarding the third scoring parameter c, a parameter value corresponding to a relatively large area that the recognizable obstacle occupies in the image is greater than or equal to a parameter value corresponding to a relatively small area that the recognizable obstacle occupies in the image;
regarding the fourth scoring parameter d, the closer the position of the recognizable obstacle in the image to a center of the image is, the greater a parameter value is; or
regarding the fifth scoring parameter e, a parameter value corresponding to a case that the fill light is not turned on is greater than or equal to a parameter value corresponding to a case that the fill light is turned on.

7. The method according to claim 4, wherein
regarding the first scoring parameter a, a parameter value corresponding to a relatively large absolute value of the angular velocity is greater than or equal to a parameter value corresponding to a relatively small absolute value of the angular velocity;
regarding the second scoring parameter b, a parameter value corresponding to a distance value within a specific range is greater than or equal to a parameter value corresponding to another distance value;
regarding the third scoring parameter c, a parameter value corresponding to a relatively large area that the recognizable obstacle occupies in the image is greater than or equal to a parameter value corresponding to a relatively small area that the recognizable obstacle occupies in the image;
regarding the fourth scoring parameter d, the closer the position of the recognizable obstacle in the image to a center of the image is, the greater a parameter value is; or
regarding the fifth scoring parameter e, a parameter value corresponding to a case that the fill light is not turned on is greater than or equal to a parameter value corresponding to a case that the fill light is turned on.

8. A non-transitory computer-readable storage medium, wherein the storage medium comprises a group of computer-executable instructions, and when the instructions are executed, operations of an image selection method applied to a self-propelled apparatus are performed, comprising:
collecting an image from a surrounding environment through an image collection device during traveling of the self-propelled apparatus;
scoring the image according to a scoring rule when there is the recognizable obstacle in the collected image, wherein a value of the scoring is used to indicate an imaging quality of the recognizable obstacle in the image; and
selecting, among all the scored images comprising the recognizable obstacle, an image that has a highest score as a to-be-displayed image in response to receive a request to view the image of the recognizable obstacle.

9. A self-propelled apparatus, comprising a processor and a memory, wherein the memory stores computer program instructions that can be executed by the processor, and when the computer program instructions are executed by the processor, operations of an image selection method are performed, comprising:
collecting an image from a surrounding environment through an image collection device during traveling of the self-propelled apparatus;
determining whether there is a recognizable obstacle in the collected image;
scoring the image according to a scoring rule when there is the recognizable obstacle in the collected image, wherein a value of the scoring is used to indicate an imaging quality of the recognizable obstacle in the image; and
selecting, among all the scored images comprising the recognizable obstacle, an image that has a highest score as a to-be-displayed image in response to receive a request to view the image of the recognizable obstacle.

10. The self-propelled apparatus according to claim 9, wherein the image selection method further comprises: after the scoring the image according to the scoring rule,
storing at least the image that has the highest score among all images comprising the recognizable obstacle.

11. The self-propelled apparatus according to claim 10, wherein the image selection method further comprises:
at least storing unique identification information that identifies the image that has the highest score.

12. The self-propelled apparatus according to claim 9, wherein
the scoring the image according to the scoring rule comprises: scoring the image through one or more of following scoring parameters:
a first scoring parameter a, characterizing an angular velocity of the self-propelled apparatus when the image is collected;
a second scoring parameter b, characterizing a distance between the self-propelled apparatus and the recognizable obstacle when the image is collected;
a third scoring parameter c, characterizing a size of an area that the recognizable obstacle occupies in the image;
a fourth scoring parameter d, characterizing a position of the recognizable obstacle in the image; and
a fifth scoring parameter e, characterizing whether a fill light is turned on when the image is collected.

13. The self-propelled apparatus according to claim 12, wherein the image selection method further comprises:
when the image is scored with at least two scoring parameters of the first scoring parameter a, the second scoring parameter b, the third scoring parameter c, the fourth scoring parameter d, and the fifth scoring parameter e are used to score the image, obtaining a score of the image by weighting parameter values of the at least two scoring parameters through preset weighting values.

14. The self-propelled apparatus according to claim 12, wherein
- regarding the first scoring parameter a, a parameter value corresponding to a relatively large absolute value of the angular velocity is greater than or equal to a parameter value corresponding to a relatively small absolute value of the angular velocity;
- regarding the second scoring parameter b, a parameter value corresponding to a distance value within a specific range is greater than or equal to a parameter value corresponding to another distance value;
- regarding the third scoring parameter c, a parameter value corresponding to a relatively large area that the recognizable obstacle occupies in the image is greater than or equal to a parameter value corresponding to a relatively small area that the recognizable obstacle occupies in the image;
- regarding the fourth scoring parameter d, the closer the position of the recognizable obstacle in the image to a center of the image is, the greater a parameter value is; or
- regarding the fifth scoring parameter e, a parameter value corresponding to a case that the fill light is not turned on is greater than or equal to a parameter value corresponding to a case that the fill light is turned on.

\* \* \* \* \*